(12) United States Patent
Onda et al.

(10) Patent No.: US 8,386,948 B2
(45) Date of Patent: Feb. 26, 2013

(54) MOBILE COMMUNICATION TERMINAL, INFORMATION PROCESSING DEVICE, AND PROGRAM

(75) Inventors: Yasushi Onda, Tokyo (JP); Izua Kano, Tokyo (JP); Dai Kamiya, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 683 days.

(21) Appl. No.: 12/594,692

(22) PCT Filed: Mar. 25, 2008

(86) PCT No.: PCT/JP2008/055597
§ 371 (c)(1),
(2), (4) Date: Oct. 5, 2009

(87) PCT Pub. No.: WO2008/126663
PCT Pub. Date: Oct. 23, 2008

(65) Prior Publication Data
US 2010/0115461 A1 May 6, 2010

(30) Foreign Application Priority Data
Apr. 6, 2007 (JP) ................................. 2007-101067

(51) Int. Cl.
*G06F 3/048* (2006.01)
(52) U.S. Cl. ......... 715/766; 715/767; 715/778; 715/789
(58) Field of Classification Search .................. 715/864, 715/765–767, 778, 781, 789–797, 806, 807
See application file for complete search history.

(56) References Cited

U.S. PATENT DOCUMENTS

| 4,819,189 | A |   | 4/1989  | Kikuchi et al. |
| 5,561,753 | A | * | 10/1996 | Coulombe et al. ............. 715/835 |
| 5,603,054 | A | * | 2/1997  | Theimer et al. .................... 710/6 |
| 5,818,410 | A | * | 10/1998 | Inoue et al. ...................... 345/98 |

(Continued)

FOREIGN PATENT DOCUMENTS

| CN | 1345170 A | 4/2002 |
| CN | 1456988 A | 11/2003 |

(Continued)

OTHER PUBLICATIONS

Japanese Patent Application No. 2007-101067; Japanese Office Action dated Oct. 11, 2011.

(Continued)

*Primary Examiner* — Tadeese Hailu
(74) *Attorney, Agent, or Firm* — Michaud-Kinney Group LLP

(57) ABSTRACT

[Problem] To make it possible to switch display of plural windows depending on a situation such as a time and a place. [Solution] A mobile communication terminal stores condition data for applications that display a window. Condition data is data describing for applications, an application (namely, a window), an attribute of a location associated with the application, and a frequency at which the application has been executed. The mobile communication terminal, if plural overlapping windows are displayed, determines a window to be displayed on top, using the condition data. For example, the mobile communication terminal, if an attribute of a location of the terminal is "office", and an application "groupware" is running, displays a window of the application on top.

7 Claims, 10 Drawing Sheets

U.S. PATENT DOCUMENTS

| | | | |
|---|---|---|---|
| 5,825,360 A * | 10/1998 | Odam et al. | 715/807 |
| 6,466,232 B1 * | 10/2002 | Newell et al. | 715/700 |
| 6,665,868 B1 | 12/2003 | Knowles et al. | |
| 7,146,193 B2 | 12/2006 | Shitahaku | |
| 7,257,777 B1 * | 8/2007 | Kanevsky et al. | 715/794 |
| 7,417,650 B1 * | 8/2008 | Horvitz | 715/765 |
| 2001/0040590 A1 * | 11/2001 | Abbott et al. | 345/700 |
| 2002/0037753 A1 * | 3/2002 | Shitahaku | 455/566 |
| 2002/0103965 A1 * | 8/2002 | Dawkins et al. | 711/113 |
| 2003/0236893 A1 * | 12/2003 | Nakamura | 709/228 |
| 2004/0005401 A1 * | 1/2004 | Becker | 427/8 |
| 2004/0056900 A1 * | 3/2004 | Blume | 345/807 |
| 2004/0070627 A1 * | 4/2004 | Shahine et al. | 345/794 |
| 2004/0192328 A1 | 9/2004 | Giacalone et al. | |
| 2007/0006098 A1 * | 1/2007 | Krumm et al. | 715/825 |
| 2007/0050725 A1 * | 3/2007 | Naono et al. | 715/764 |
| 2007/0083827 A1 * | 4/2007 | Scott et al. | 715/811 |
| 2007/0261055 A1 * | 11/2007 | Kunjithapatham et al. | 718/100 |
| 2007/0288864 A1 * | 12/2007 | Keereepart et al. | 715/790 |
| 2008/0215626 A1 * | 9/2008 | Gomez | 707/104.1 |

FOREIGN PATENT DOCUMENTS

| | | |
|---|---|---|
| JP | 63133226 | 6/1988 |
| JP | 05011960 | 1/1993 |
| JP | 06149521 | 5/1994 |
| JP | 08161139 | 6/1996 |
| JP | 10-171624 | 6/1998 |
| JP | 10154060 | 6/1998 |
| JP | 2005217522 | 8/2005 |
| JP | 2006285833 | 10/2006 |
| KR | 1990-0002950 | 5/1990 |

OTHER PUBLICATIONS

Korean Office Action for KR App No. 10-2009-7020762 dated Mar. 14, 2011 with English translation.
Chinese Office Action for CN200880010753.3 dated Feb. 24, 2011, with full English translation.
Japanese Office Action for JP Patent Application No. 2007-101067 dated Jun. 15, 2011.
Kadobayashi, Rieko, "P2P based Collaborative Annotation Environment for Digital Archives", National Institute of Information and Communications Technology. 2004.
Russian Office Action for Russian Patent Application No. RU2009140984(058283) dated Feb. 2, 2011.
Office Action with English Translation, Dated Feb. 29, 2012, issued in conjunction with Chinese Patent Application No. 2008800107533.

* cited by examiner

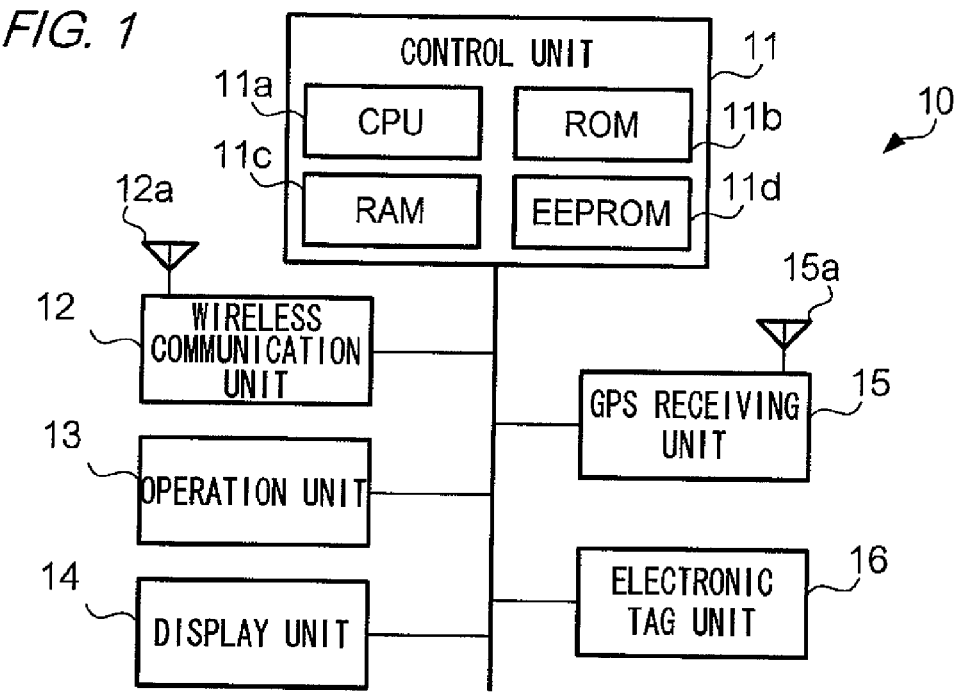
FIG. 1
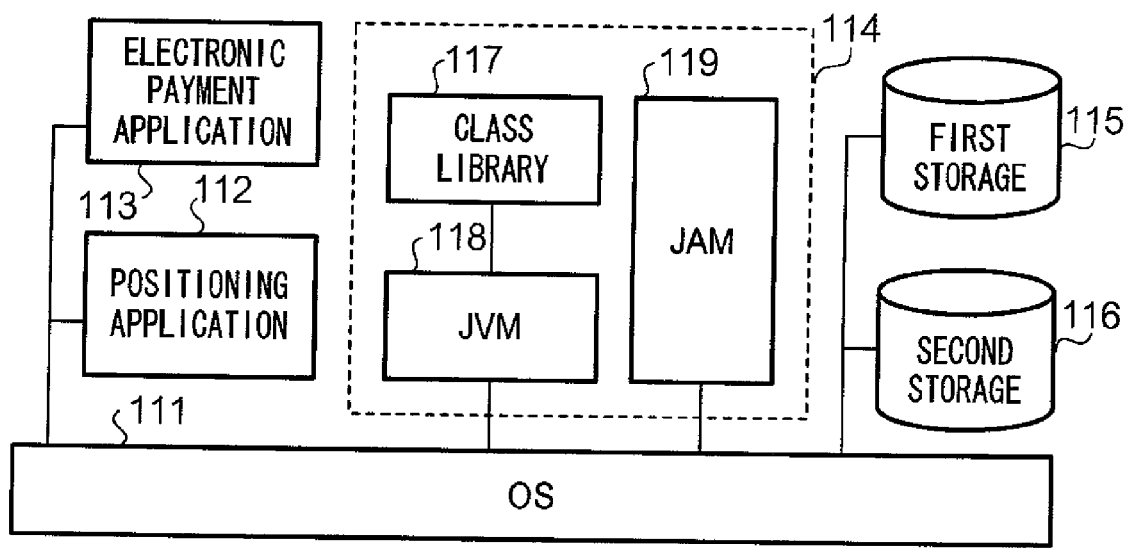
FIG. 2
FIG. 3
| LOCATION | ATTRIBUTE |
|---|---|
| ....... | OFFICE |
| ....... | STATION |
| ....... | RAIL ROUTE |
| ....... | HOME |
| ....... | BUSINESS DISTRICT |

| APPLICATION NAME | APPLICATION ATTRIBUTE | DISPLAY FREQUENCY |
|---|---|---|
| GROUPWARE | OFFICE | 7 |
| ELECTRONIC TICKET | STATION | 10 |
| TRANSFER GUIDE | RAIL ROUTE | 8 |
| ONLINE GAME | HOME, RAIL ROUTE | 12 |
| GPS NAVIGATION | BUSINESS DISTRICT | 5 |

FIG. 7
(a) 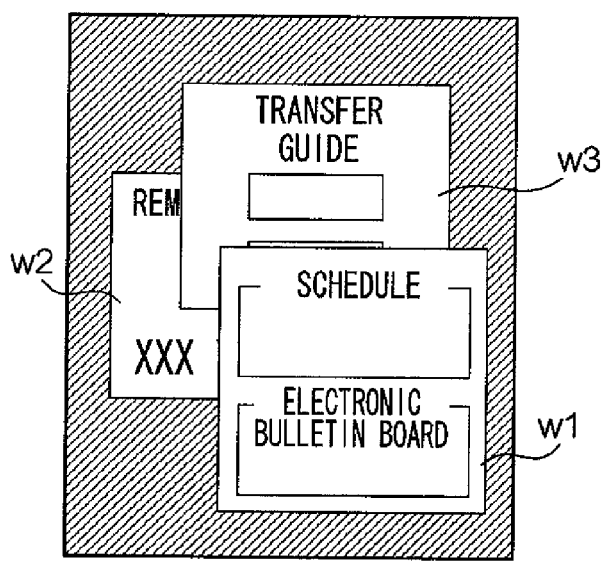
(b) 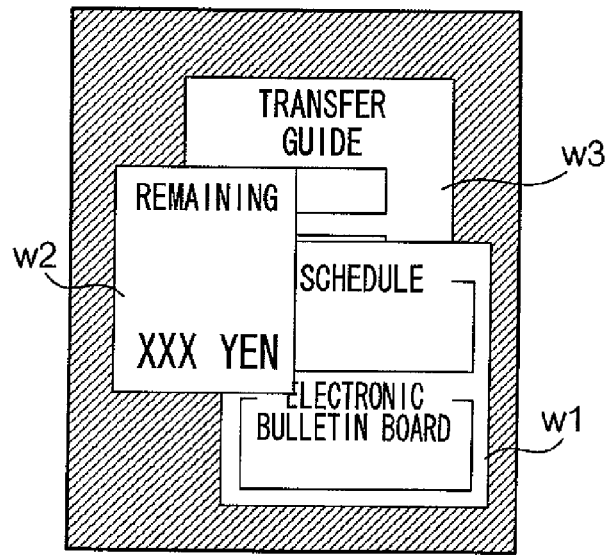
(c) 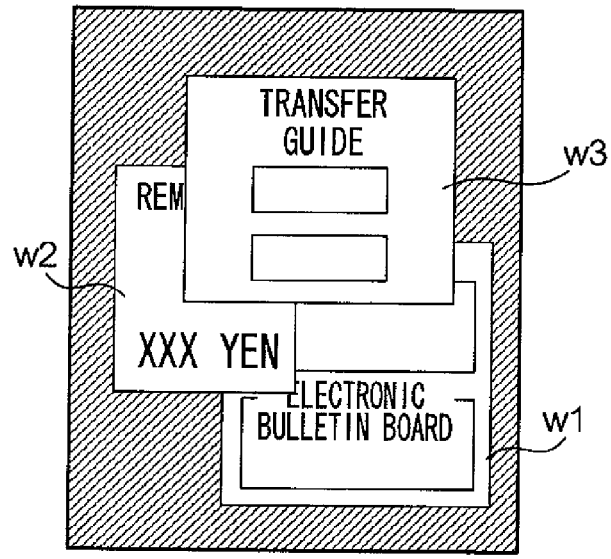

FIG. 8
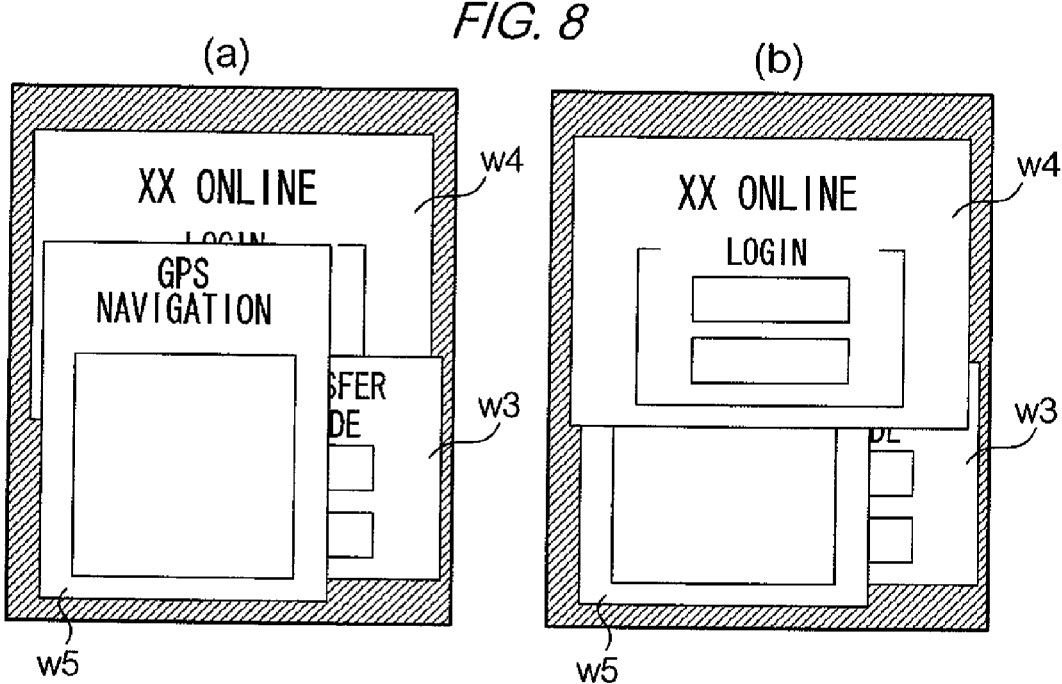
FIG. 9
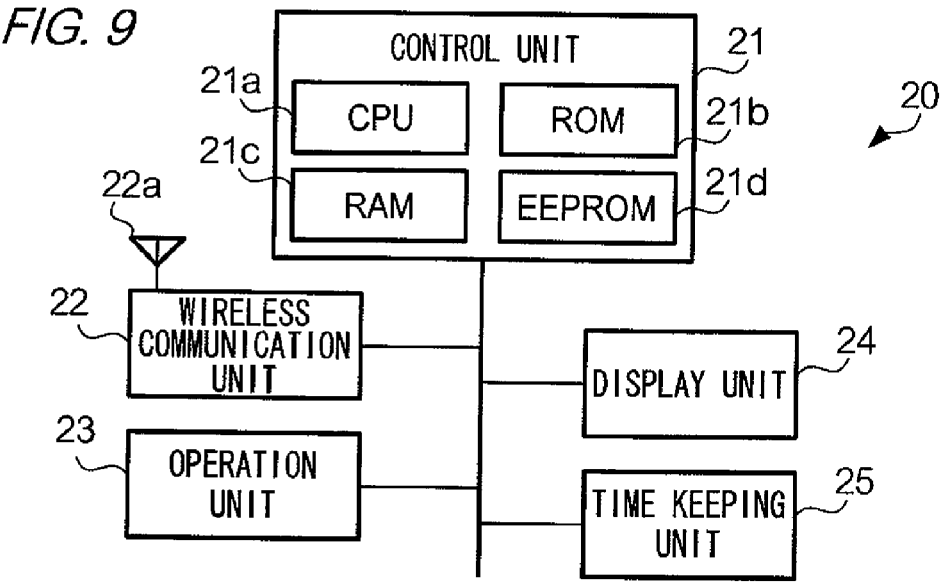
FIG. 10
| APPLICATION NAME | RELEVANT TIME ZONE | DISPLAY FREQUENCY |
|---|---|---|
| NEWS TICKER | 07:00~09:30 | 12 |
| GROUPWARE | 09:31~18:31 | 7 |
| WEB BROWSER | 18:31~23:00 | 10 |

FIG. 13

| APPLICATION NAME | APPLICATION ATTRIBUTE | DISPLAY FREQUENCY (OFFICE) | DISPLAY FREQUENCY (STATION) | DISPLAY FREQUENCY (RAIL ROUTE) | DISPLAY FREQUENCY (HOME) | DISPLAY FREQUENCY (BUSINESS DISTRICT) |
|---|---|---|---|---|---|---|
| GROUPWARE | OFFICE | 7 | 0 | 0 | 0 | 0 |
| ELECTRONIC TICKET | STATION | 0 | 8 | 1 | 1 | 0 |
| TRANSFER GUIDE | RAIL ROUTE | 0 | 2 | 4 | 1 | 1 |
| ONLINE GAME | HOME, RAIL ROUTE | 0 | 1 | 4 | 7 | 0 |
| GPS NAVIGATION | BUSINESS DISTRICT | 0 | 0 | 0 | 0 | 5 |

FIG. 14

| WINDOW | ATTRIBUTE | DISPLAY FREQUENCY | PRIORITY |
|---|---|---|---|
| wa | IDENTICAL | 7 | 2 |
| wb | IDENTICAL | 5 | 3 |
| wc | IDENTICAL | 10 | 1(HIGHEST) |
| wd | NON-IDENTICAL | 15 | 4 |
| we | NON-IDENTICAL | 7 | 6(LOWEST) |
| wf | NON-IDENTICAL | 12 | 5 |

MOBILE COMMUNICATION TERMINAL, INFORMATION PROCESSING DEVICE, AND PROGRAM

TECHNICAL FIELD

The present invention relates to a GUI (Graphical User Interface).

BACKGROUND ART

A technique of display control in a case where plural windows overlap each other is known, as described in JP-A-8-161139. JP-A-8-161139 discloses, for example, in a case where at least two windows are displayed on a display screen so that the two windows partly overlap each other, replacing a window in the foreground with a window in the background at predetermined intervals of time, and determining for each window a length of time to display the window in the foreground, depending on the length of time for which the window is used.

DISCLOSURE OF THE INVENTION

When windows are displayed, on a display, the desired window to be viewed varies depending on a situation where the windows are displayed. For example, applications frequently used at the office and those frequently used at home may be different, and accordingly, windows frequently viewed at the office and those frequently viewed at home may be different.

In view of the foregoing condition, the present invention aims at making it possible to switch display of plural windows depending on a situation such as time and place.

SUMMARY OF THE INVENTION

A mobile communication terminal according to the present invention comprises: a detecting means for detecting a location of the mobile communication terminal; an identifying means for identifying windows overlapping another window on a display means; a storage means for storing the windows and locations associated with the windows; a determining means for determining priority levels of display for the windows identified by the identifying means, so that a priority level of a window stored in the storage means in association with the location detected by the detecting means is higher; and a display control means for displaying a window whose priority level determined by the determining means is higher ahead of a window whose priority level determined by the determining means is lower.

In the description, a "location" includes not only a certain point, but also an area having a certain range.

An information processing device according to the present invention comprises: a detecting means for detecting a time; an identifying means for identifying windows overlapping another window on a display means; a storage means for storing the windows and time periods associated with the windows; a determining means for determining priority levels of display for the windows identified by the identifying means, so that a priority level of a window stored in the storage means in association with a time period including the time detected by the detecting means is higher; and a display control means for displaying a window whose priority level determined by the determining means is higher ahead of a window whose priority level determined by the determining means is lower.

In the description, a "time" includes not only a clock time, but also data and hour, and a season.

The mobile communication terminal or the information processing device according to the present invention may comprise a specifying means for specifying a window, and if a window specified by the specifying means is included in the identified windows, the display control means may display the window on top.

Alternatively, the mobile communication terminal or the information processing device according to the present invention may comprise a specifying means for specifying a window, and if a window specified by the specifying means is included in the identified windows, the determining means may determine priority levels of display for the windows other than the specified window.

The mobile communication terminal (or the information processing device) according to the present invention may comprise a history storage means for storing for each window displayed by the display means, a display frequency and a display time length, the display frequency and the display time length being stored for each location (or each time period), and if there are plural windows that are stored in the storage means in association with the location detected by the detecting means (or a time period including the time detected by the detecting means), the determining means may set a higher priority level of a window among the plural windows whose frequency or time length stored in the history storage means in association with the location (or the time period) is higher.

A program according to the present invention causes a computer to execute the steps of: detecting a location of the mobile communication terminal; identifying windows overlapping another window on a display means; identifying a window, with reference to a storage means for storing the windows and locations associated with the windows, the window being stored in association with the detected location, and determining priority levels of display for the windows so that a priority level of the identified window is higher; and displaying the window whose priority level is higher ahead of a window whose priority level is lower.

A program according to the present invention causes a computer to execute the steps of: detecting a time; identifying windows overlapping another window on a display means; determining priority levels of display for the identified windows with reference to a storage means for storing the windows and time periods associated with the windows, so that a priority level of a window stored in association with a time period including the detected time is higher; and displaying the window whose priority level is higher ahead of a window whose priority level is lower.

Effects of the Invention

According to the present invention, a display control is carried out so that a window associated with a detected location or time is preferentially displayed on top. Accordingly, if plural windows overlap each other, display of the plural windows can be switched depending on a time or a place.

BRIEF DESCRIPTION OF THE DRAWINGS

FIG. 1 is a block diagram showing a configuration of a mobile communication terminal, which is a first embodiment of the present invention.

FIG. 2 is a diagram showing a logical configuration of a mobile communication terminal.

FIG. 3 is a diagram illustrating location attribute data.

FIG. 7 is a diagram illustrating display of windows.

FIG. 8 is a diagram illustrating display of windows.

FIG. 9 is a block diagram showing a configuration of another embodiment of a mobile communication terminal, of the present invention.

FIG. 10 is a diagram showing condition data.

FIG. 13 is a diagram illustrating a modified version of condition data.

FIG. 14 is a diagram describing control for determining a priority.

DETAILED DESCRIPTION OF THE PREFERRED EMBODIMENTS

Figures 4, 5:
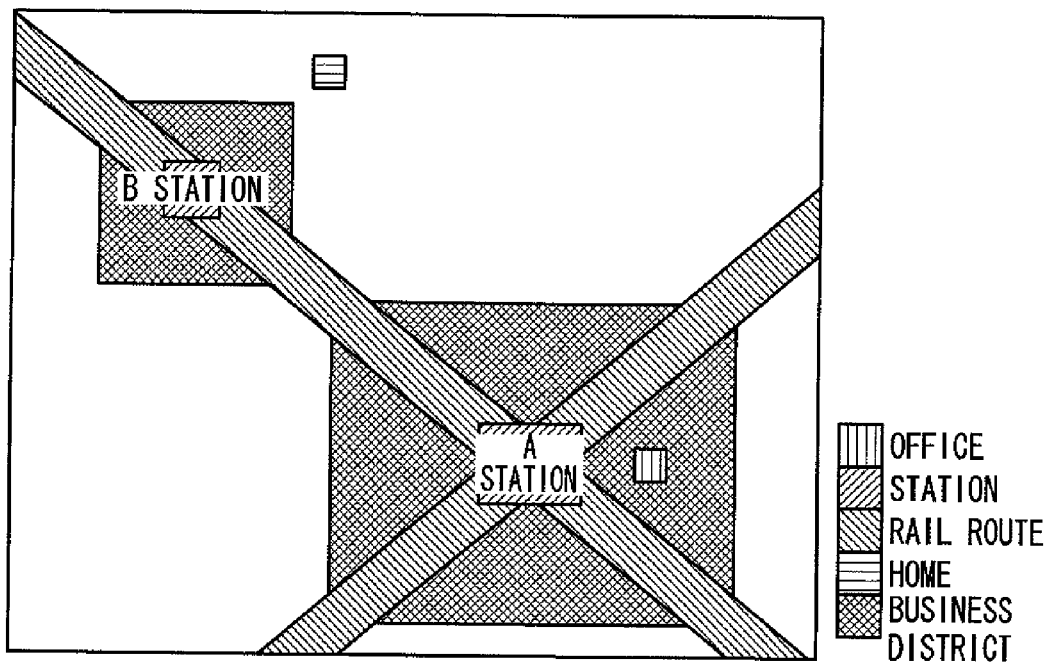
FIG. 4 is a view illustrating a frame format of location attribute data.
FIG. 5 is a diagram showing condition data.

FIG. 1 is a block diagram showing a configuration of a mobile communication terminal, which is a first embodiment of the present invention. As shown in the drawing, mobile communication terminal 10 includes control unit 11, wireless communication unit 12, operation unit 13, display unit 14, GPS receiving unit 15, and electronic tag unit 16. In the present embodiment, mobile communication terminal 10 is a mobile phone.

Control unit 11 includes CPU (Central Processing Unit) 11a, ROM (Read Only Memory) 11b, RAM (Random Access Memory) 11c, and EEPROM (Electronically Erasable and Programmable ROM). CPU 11a executes a program stored in ROM 11b or EEPROM 11d, using RAM 11a as a work area, thereby controlling operations of components of mobile communication terminal 10. Wireless communication unit 12 includes antenna 12a, and performs wireless data communication with a predetermined mobile communication network. Operation unit 13 includes operation keys such as buttons, and provides an operation signal corresponding to an operation by a user, to control unit 11. Display unit 14 includes a liquid crystal display and a liquid crystal driver circuit, and displays an image corresponding to display data provided from control unit 11. GPS receiving unit 15 includes antenna 15a, and receives a radio signal (hereinafter, referred to as "GPS signal") transmitted from so-called GPS (Global Positioning System) satellites. Electronic tag unit 16 includes an electronic tag such as an RFID (Radio Frequency IDentification) tag, and realizes a so-called electronic payment function of making payment using data pre-stored data. The electronic payment function is realized through communication by mobile communication terminal 10 with a predetermined reader/writer placed in a station or a shop that is approached by the mobile communication terminal.

ROM 11b pre-stores some programs. The programs are hereinafter referred to as "preinstalled programs." The preinstalled programs are specifically a multitasking operating system (hereinafter referred to as "multitasking OS"), a Java (Registered Trademark) platform, and native applications. The multitasking OS is an operating system supporting functions such as allocation of virtual memory spaces, which are necessary to realize a pseudo-parallel execution of plural tasks using a TSS (Time-Sharing System). The Java platform is a bundle of programs that are described in accordance with a CDC (Connected Device Configuration), which is a configuration for providing Java execution environment 114 (described later) in mobile communication terminal 10 with a multitasking OS. Native applications are programs for providing mobile communication terminal 10 with basic functions such as voice communication and positioning, and include an application for receiving a positioning service (positioning application 112 described later) and an application for realizing an electronic payment function (electronic payment application 113 described later).

EEPROM 11d has a Java application storage area for storing Java applications. A Java application consists of: a JAR (Java Archive) file including an entity program that describes a procedure carried out under a Java execution environment, and image files and audio files used when the entity program is running; and an ADF (Application Descriptor File) in which information on installation and execution of the JAR file and attribute information of the JAR file are described. A Java application is created by a content provider or a carrier, and stored in an external server, and in response to a request from mobile communication terminal 10, is sent to the device from the external server.

FIG. 2 is a diagram illustrating a logical configuration of units provided in controller 11 of mobile communication terminal 10 through execution of programs stored in ROM 11b and EEPROM 11d. As shown in the drawing, in OS 111 of mobile communication terminal 10 executing the programs, positioning application 112, electronic payment application 113, and Java execution environment 114 are provided. In EEPROM 11d, first storage 115 and second storage 116 are secured. Positioning application 112 and electronic payment application 113 are realized by native applications stored in ROM 11b.

Positioning application 112 realizes a function of identifying a location of the terminal on the basis of a GPS signal received by GPS receiving unit 15. When an operation using positioning application 112 is performed, location information is generated. Location information is information indicating a location of the terminal measured using positioning application 112. Location information represents a location of the terminal expressed by latitude and longitude.

Electronic payment application 113 realizes the above-mentioned electronic payment function on the basis of a result of communication by electronic tag unit 16. When an operation using electronic payment application 113 is performed, data representing monetary value (hereinafter, referred to as "electronic value") stored in electronic tag unit 16 is rewritten. Electronic payment application 113, in accordance with an instruction from a reader/writer, when goods or services are purchased, rewrites data to reduce an electronic value, and when an electronic value is charged, rewrites data to increase the electronic value.

Electronic payment application 113 is also able to obtain data representing a location of a reader/writer, when communication with a reader/writer is made. This data represents information indicating a location of the terminal (at a time of payment), which is the same as the above-mentioned location information. Accordingly, information obtained by electronic payment application 13 is hereinafter included in "location information."

Java execution environment 114 is provided through execution of Java platform stored in ROM 11b. Java execution environment 114 includes class library 117, JVM (Java Virtual Machine) 118, and JAM (Java Application Manager) 119. Class library 117 is a collection of program modules (classes) that provide a particular function. JVM 118 is a Java execution environment optimized for the above-mentioned CDC, and has a function of interpreting and executing bytecode provided as a Java application. JAM 119 has a function of managing download, installation, execution, or termination of a Java application.

First storage 115 is a storage for storing Java applications (Jar files and ADFs) downloaded under the control of JAM 119. Second storage 116 is a storage for storing data that is generated during execution of a Java application, after the application is terminated. A storage area of second storage 116 is assigned to each of installed Java applications. Data of a storage area assigned to a Java application can be rewritten during execution of the Java application, and cannot be rewritten during execution of another Java application.

EEPROM 11*d* stores, in addition to the above mentioned data, location attribute data and condition data. Location attribute data is data representing a location and an attribute associated with the location. Condition data is data representing a condition for determining a priority order of windows, with regard to an application executed in mobile communication terminal 10, invoking display of windows by display unit 14.

FIG. 3 is a diagram illustrating location attribute data according to the present embodiment. As shown in the drawing, location attribute data is data describing a "location" and an "attribute" in association with each other. A "location" is data representing a certain area, which may include plural locations represented by location information. An area may be expressed by describing location information defining a boundary of an area, or describing location information included in the area. An "attribute" is data representing an attribute associated with an area specified by a "location". An attribute may be any data as long as the data is able to make each area identifiable.

FIG. 4 shows location attribute data of FIG. 3 shown as an actual map. The example of FIG. 4 shows that railroads extend in four directions from A station, and B station is northwest (upper left) of A station. The example also shows that a business district is formed around A station and B station, an office of a user is near A station, and a home of a user is near B station.

Location attribute data may be provided in advance by a manufacturer of mobile communication terminal 10 or a carrier operating a mobile communication network; however, an attribute of a location unique to each user such as the above-mentioned home or office of a user may be preferably defined by a user at his/her discretion. In addition, with regard to setting of an "attribute", categories may be preferably increased or decreased by a user.

FIG. 5 is a diagram illustrating condition data according to the present embodiment. As shown in the drawing, condition data is data describing an "application name", an "application attribute", and a "display frequency" in association with each other. An "application name" is data for identifying an application. An "application attribute" is data representing an "attribute" of location attribute data to which an application is assigned. For example, an application "groupware" of FIG. 5 has an attribute "Office." A "display frequency" is data representing a frequency at which an application has been executed. In other words, a "display frequency" is data representing a frequency at which a window corresponding to the application has been displayed.

Now, applications included in condition data shown in FIG. 5 will be briefly described. A "groupware" is an application realizing information sharing among users of an office. A "groupware" includes a function of displaying a schedule of each user and a function of displaying a so-called electronic bulletin board relating to business. An "electronic ticket" is an application for causing mobile communication terminal 10 to function as a train ticket, and it charges an electronic value, and reduces a charged electronic value at a ticket gate, using electronic tag unit 16. An "electronic ticket" has a function of displaying a remaining electronic value and an amount by which the electronic value is reduced. A "transfer guide" is an application for displaying a rail route and providing guidance from a starting station to a destination station. An "online game" is an application for executing a game using communication via a mobile communication network. A "GPS navigation" is an application for displaying a route from a current location of a user (namely, mobile communication terminal 10) to a destination such as a shop using a GPS signal, thereby guiding a user.

An "application attribute" is data representing a location where an application is frequently used. Accordingly, an example of FIG. 5 shows that a "groupware" is an application frequently used in an office. Also, as in the case of an "online game" of FIG. 5, plural application attributes may be assigned to a single application. The example of FIG. 5 shows that an "online game" is frequently used not only at home but also during a rail journey (in other words, in a commuting time).

The foregoing is a description of a configuration of mobile communication terminal 10. With the configuration, mobile communication terminal 10 executes plural applications in accordance with a request of a user. When an application is executed, control unit 11 of mobile communication terminal 10 also functions as a measuring means for measuring a frequency at which the application is executed, which is configured to update a "display frequency" of condition data.

When executing plural applications, mobile communication terminal 10 is able to display plural windows each of which corresponds to one of the plural applications. When doing so, mobile communication terminal 10 displays windows in a so-called overlap window system. Accordingly, mobile communication terminal 10 is able to change a display position of a window or display plural windows in a stack. To this end, control unit 11 of mobile communication terminal 10 stores data on display positions of plural windows (hereinafter referred to as "window data"), and if one of the windows is moved, updates the stored data. If there are overlapping windows, mobile communication terminal 10 displays on top a window that has become active (a status receptive to an operation) most recently. Accordingly, a window displayed on top is a currently active window.

In the present embodiment, a "window" means a display area assigned to each application when the application provides a certain function. A display area may have any shape or appearance; thus, a display area does not have to have a window-like (rectangular) shape. However, in drawings referred to in the following description, windows are depicted as having a rectangular shape, for convenience of explanation. When a window is displayed on top of another window, only the top window is visible, and a display area of the other window covered by the top window is not visible. In the following description, "bottom" is used to describe a position of a window a part of which is covered by another, "top," window.

According to the present embodiment, mobile communication terminal 10, if there are overlapping windows, determines a window to be displayed on top, on the basis of a location of the terminal. To do so, mobile communication terminal 10 carries out an operation described below.

Figure 6:
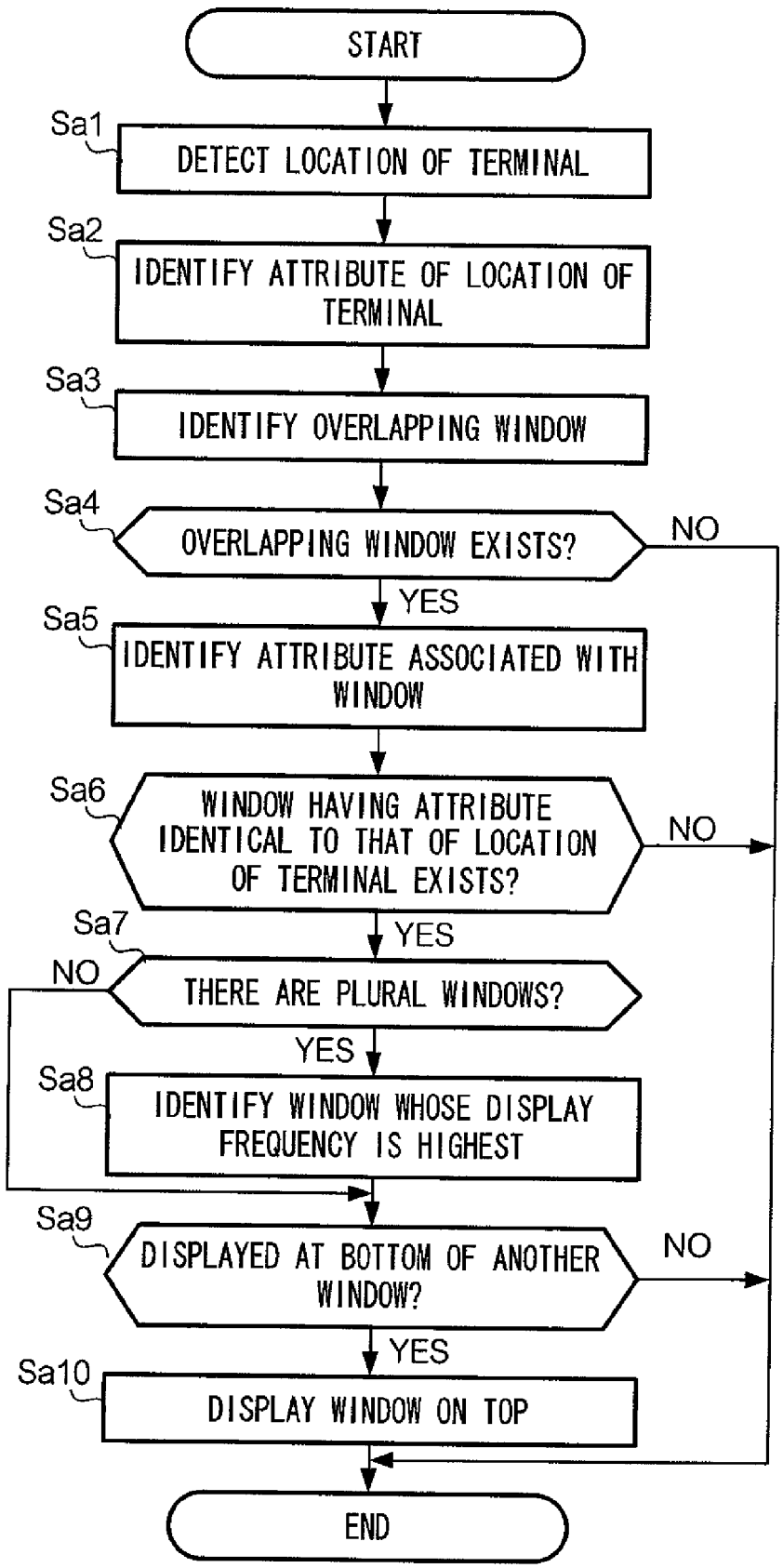
FIG. 6 is a flowchart showing an operation carried out by a mobile communication terminal.

FIG. 6 is a flowchart showing an operation carried out by control unit 11 of mobile communication terminal 10. The operation is realized as a function of a multitasking OS, and is carried out at predetermined intervals. As shown in the drawing, control unit 11 initially obtains location information to detect a location of the terminal (step Sa1). When doing so, control unit 11 may obtain location information using a function of positioning application 112 or using a function of electronic payment application 113. Subsequently, control unit 11 identifies an attribute of a location of the terminal on the basis of the detected location (step Sa2). When doing so, control unit 11 identifies an attribute assigned to an area including the obtained location information, with reference to location attribute data.

Subsequently, control unit 11 recognizes a condition in which windows are displayed on display unit 14 to identify overlapping windows (step Sa3). When doing so, control unit 11 determines presence of overlapping on the basis of stored window data. Also, control unit 11 identifies each of a window obscuring another window and a window obscured by another window as an overlapping window. Namely, if there are overlapping windows, control unit 11 identifies each of a top window and a bottom window as an overlapping window. This applies to a case where three or more windows overlap with each other in a given area.

Subsequently, control unit 11 determines whether an overlapping window exists by determining whether a window identified at step Sa3 exists (step Sa4). If it is determined that an overlapping window is displayed (step Sa4: YES), control unit 11 identifies an application corresponding to the identified window to identify an attribute associated with the application (step Sa5). When doing so, control unit 11 refers to condition data to retrieve an "application attribute" of an application corresponding to the identified window, thereby identifying an attribute. Control unit 11 identifies an attribute with regard to all overlapping windows. It is to be noted that since a window corresponds to a particular application, an attribute associated with an application can be said to be an attribute associated with a corresponding window.

After identifying an attribute with regard to each overlapping window, control unit 11 determines whether a window exists whose attribute is identical to that of a location of the terminal (namely, the attribute identified at step Sa2) (step Sa6). If such a window exists (step Sa6: YES), control unit 11 determines whether there are plural windows whose attribute is identical to that of a location of the terminal (step Sa7). If there are plural windows whose attribute is identical to that of a location of the terminal (step Sa1: YES), control unit 11 identifies a window whose display frequency is highest among the plural windows (step Sa8). When doing so, control unit 11 refers to condition data to retrieve a "display frequency" of an application having the identified attribute, thereby identifying a window whose display frequency is highest. If there is only a single window whose attribute is identical to that of a location of the terminal (step Sa1: NO), control unit 11 skips an operation of step Sa8 and proceeds to a subsequent operation.

Subsequently, control unit 11 determines whether a subject window is displayed at the bottom of another window (step Sa9). A subject window is the window identified at step Sa8, or if there is only a single window whose attribute is identical to that of a location of the terminal, that window is the subject window. Control unit 11 specifies either of the windows as a subject window of step Sa9. Control unit 11, if a subject window is displayed at the bottom of another window (step Sa9: YES), changes a display order of windows so that the window is displayed on top, and outputs corresponding display data (step Sa10).

It is to be noted that if the determination at step Sa4, Sa6, or Sa9 is negative (namely, NO), control unit 11 terminates the operation without changing a display order of windows. This is because in such a case, a window is displayed on top that should be displayed on top.

Now, the above operation will be described with reference to a concrete example of a display of windows. In the example, location attribute data and condition data are as shown in FIGS. 3 to 5. Also, a window of a groupware is referred to as "w1", and similarly, windows of an electronic ticket, a transfer guide, an online game, and a GPS navigation are referred to as "w2", "w3", "w4", and "w5", respectively.

For example, it is assumed that a groupware, an electronic ticket, and a transfer guide are executed, and their windows are displayed as shown in FIG. 7(*a*). (In the drawing, the whole screen of display unit 14 is indicated by hatching.) In that case, if a user is in an office, a display of display unit 14 shown in FIG. 7(*a*) is maintained. This is because window w1 of a groupware has an attribute "office."

With the display maintained, if a user moves to A station, a display of display unit 14 is changed so that a screen shown in FIG. 7(*b*) is displayed. Namely, control unit 11 displays window w2 of an electronic ticket having an attribute "station", on top. Control unit 11 makes the switching immediately after the terminal passes a ticket gate, if location information is obtained using a function of electronic payment application 113.

If the user passes a ticket gate of A station, and rides a train, a display of display unit 14 is changed so that a screen shown in FIG. 7(*c*) is displayed. Namely, control unit 11 displays window w3 of a transfer guide having an attribute "rail route," on top.

Subsequently, it is assumed that a transfer guide, an online game, and a GPS navigation are executed, and their windows are displayed as shown in FIG. 8(*a*). In this case, if a user is in a business district, a display of display unit 14 shown in FIG. 8(*a*) is maintained so that window w5 of a GPS navigation is displayed on top. Even if the user moves to station A from the business district, a display of display unit 14 does not change, because no application having an attribute "station" is currently running (see step Sa6 of FIG. 6).

Subsequently, if the user passes a ticket gate of A station (without using an electronic ticket), and rides a train, a display of display unit 14 is changed so that a screen shown in FIG. 8(*b*) is displayed. Namely, control unit 11 displays window w4 of an online game having an attribute "rail route," on top. It is to be noted that window w3 of a transfer guide has an attribute "rail route" as well; however, since a display frequency of a transfer guide is lower than that of an online game, window w3 of a transfer guide is not displayed on top (see steps Sa1 and Sa8 of FIG. 6).

Mobile communication terminal 10 according to the present embodiment, by repeatedly carrying out the above operation, changes a display of windows in response to change in a location of the terminal, even if a user does not conduct any operation. Specifically, mobile communication terminal 10 displays the entire area of a window that is likely to be viewed, depending on a positional condition of the terminal, thereby enabling a user to swiftly conduct a subsequent operation. The operation achieves a marked effect especially when multitasking is used to perform operations in a small device such as a mobile communication terminal, which has limitations in operation keys and a screen size.

According to the present embodiment, if there are windows having an identical attribute overlap with each other, and mobile communication terminal 10 moves to a location having the attribute, the terminal also displays a window whose display frequency is higher on top. Accordingly, mobile communication terminal 10 is able to preferentially display the entire area of a window that is likely to be viewed, on top.

Second Embodiment

FIG. 9 is a block diagram showing an entire configuration of a mobile communication terminal that is a second embodiment of the present invention. As shown in the drawing, mobile communication terminal 20 includes control unit 21, wireless communication unit 22, operation unit 23, display unit 24, and time keeping unit 25. Control unit 21 includes CPU 21a, ROM 21b, RAM 21c, and EEPROM 21d. Wireless communication unit 22 includes antenna 22a. The configurations of control unit 21, wireless communication unit 22, operation unit 23, and display unit 24 are similar to those of control unit 11, wireless communication unit 12, operation unit 13, and display unit 14 of the first embodiment, respectively; accordingly, description of the units is omitted. However, programs and data stored in control unit 21 are partially different from those stored in control unit 11. For example, control unit 21 does not have to be able to execute the above-mentioned positioning application 112 or electronic payment application 113. Also, control unit 21 does not have to store location attribute data. Time keeping unit 25 includes an internal clock, which outputs time data representing a current time to control unit 21. Time keeping unit 25 keeps time even while mobile communication terminal 20 is powered off. Control unit 21, to detect a current time, may obtain time data from time keeping unit 25 as needed, or obtain time data from time keeping unit 25 when the terminal is powered on, and update the obtained time data internally.

FIG. 10 is a diagram illustrating condition data according to the present embodiment. As shown in the drawing, condition data is data describing an "application name," a "relevant time zone," and a "display frequency" in association with each other. An "application name" is data for identifying an application. A "relevant time zone" is data representing a time zone associated with an application, which represents, for example, a time zone 7:00 a.m. to 9:30 a.m. A "display frequency" is data representing a frequency at which an application has been executed. In other words, a "display frequency" is data representing a frequency at which a window corresponding to the application has been displayed.

Now, applications included in condition data shown in FIG. 10 will be briefly described. A "groupware" is an application similar to the groupware appearing in the first embodiment. A "news ticker" is an application that continuously obtains news via a mobile communication network, and sequentially displays the news. A "Web browser" is an application that obtains a Web page from the Internet via a mobile communication network, and displays the page.

In FIG. 10, a "relevant time zone" is associated with a daily action of a user. The example of FIG. 10, shows that a time zone 7:00 a.m. to 9:30 a.m. is commonly a pre-work time for a user, that the user commonly works in an office from 9:31 a.m. to 6:30 p.m., and that the user commonly spends time freely after work.

The foregoing is a description of a configuration of mobile communication terminal 20. With the configuration, mobile communication terminal 20 executes plural applications in accordance with a request of a user. The operation of mobile communication terminal 20 is similar to that of mobile communication terminal 10 according to the first embodiment, except for a control for switching a top window, and overlapping description is omitted.

Mobile communication terminal 20 according to the present embodiment, if there are overlapping windows, determines a window to be displayed on top, on the basis of time. To do so, mobile communication terminal 20 carries out an operation described below.

Figure 11:
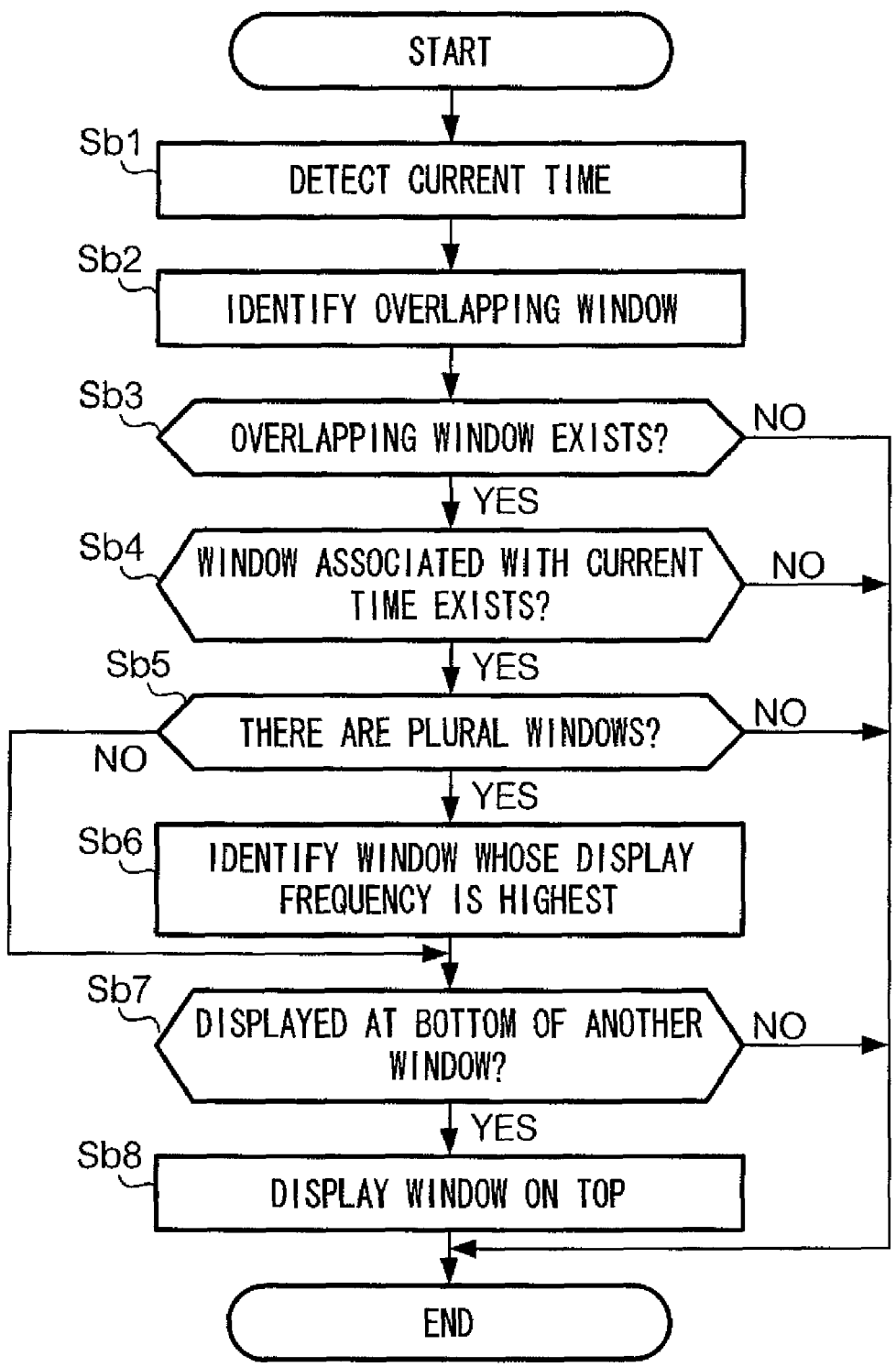
FIG. 11 is a flowchart showing an operation carried out by a mobile communication terminal.

FIG. 11 is a flowchart showing an operation carried out by control unit 21 of mobile communication terminal 20. In the following description, a description relating to steps for conducting an operation similar to that of a step appearing in the flowchart shown in FIG. 6 will be omitted. As shown in FIG. 11, control unit 21 initially detects a current time on the basis of time data output from time keeping unit 25 (step Sb1). Subsequently, control unit 21 recognizes a condition in which windows are displayed on display unit 24, on the basis of window data, to identify overlapping windows (step Sb2). Subsequently, control unit 21 determines whether an overlapping window exists by determining whether a window identified at step Sb2 exists (step Sb3).

If it is determined that an overlapping window is displayed (step Sb3: YES), control unit 21 determines whether a window associated with the identified current time is included in the overlapping windows (step Sb4). When doing so, control unit 21 refers to condition data to retrieve a "relevant time zone" of an application corresponding to the identified window. If the identified current time is included in the "relevant time zone", control unit 21 determines that the window of the application is a window associated with a current time.

If it is determined that a window associated with a current time overlaps another window (step Sb4: YES), control unit 21 determines whether there are plural windows associated with a current time, overlapping another window (step Sb5). If there are plural windows associated with a current time, overlapping another window (step Sb5: YES), control unit 21 identifies a window whose display frequency is highest among the plural windows (step Sb6). When doing so, control unit 21 refers to condition data to retrieve a "display frequency" of an application corresponding to the identified window, thereby identifying a window whose display frequency is highest. If only a single window associated with the identified current time overlaps another window (step Sb5: NO), control unit 21 skips an operation of step Sb6 and proceeds to a subsequent operation.

Subsequently, control unit 21 determines whether a subject window is displayed at the bottom of another window (step Sb7). A subject window is the window identified at step Sb6, or if there is only a single window associated with the identified current time, that window is the subject window. Control unit 21 specifies either of the windows as a subject window of step Sb7. Control unit 21, if a subject window is displayed at the bottom of another window (step Sb7: YES), changes a display order of windows so that the window is displayed on top, and outputs corresponding display data (step Sb8).

It is to be noted that if the determination at step Sb3, Sb4, or Sb7 is negative (namely, NO), control unit 21 terminates the operation without changing a display order of windows. This is because in such a case, a window is displayed on top that should be displayed on top.

Now, the above operation will be described with reference to a concrete example of a display of windows. In the example, condition data is as shown in FIG. 10. Also, a window of a groupware is referred to as "w6", and windows of a news ticker and a Web browser are referred to as "w7" and "w8", respectively. Also, in the example, it is assumed that all the windows are displayed, and at least a part of each displayed window overlaps another window.

Figure 12:
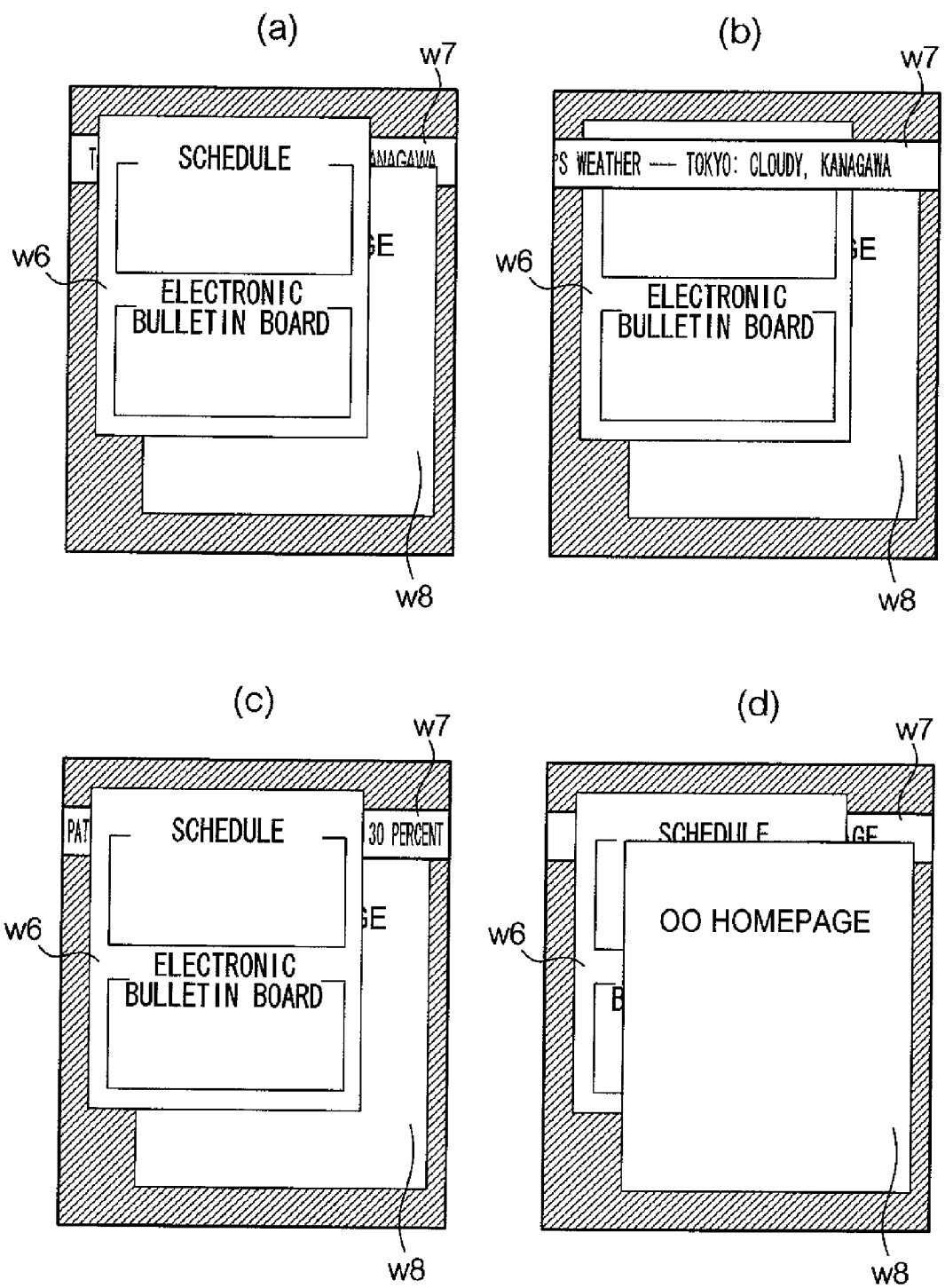
FIG. 12 is a diagram illustrating display of windows.

For example, it is assumed that mobile communication terminal 20 is powered on at 7:00 a.m. If it is also assumed that at the same time, mobile communication terminal 20 sequentially executes a news ticker, a Web browser, and a groupware, windows of the applications are displayed as shown in FIG. 12(a). Namely, a window corresponding to a last application that has been executed is displayed on top. Subsequently, if control unit 21 carries out the operation shown in FIG. 11, a display of display unit 24 is changed so that a screen shown in FIG. 12(b) is displayed. Namely, control unit 21 controls display so that window w7 of a news ticker associated with a current time zone is displayed on top.

Subsequently, after 9:30 a.m., a display of display unit 24 is changed so that a screen shown in FIG. 12(c) is displayed. Namely, control unit 21 displays window w6 of a groupware associated with a current time zone on top. Subsequently, after 6 p.m., a display of display unit 24 is changed so that a screen shown in FIG. 12(d) is displayed. Namely, control unit 21 displays window w8 of a Web browser associated with a current time zone on top.

Mobile communication terminal 20 according to the present embodiment, by repeatedly carrying out the above operation, changes a display of windows in response to change in time, even if a user does not conduct any operation. For example, according to the foregoing case, a user is able to check news using a news ticker before s/he goes to work, view a groupware during work, and browse Web pages using a Web browser after work, even if the user does not select a window in advance. Accordingly, mobile communication terminal 10 is able to display an entire area of a window that is likely to be viewed, depending on a temporal condition of the terminal, thereby enabling a user to swiftly conduct a subsequent operation.

MODIFICATIONS

Obviously, the present invention may be implemented in an embodiment different from the above-mentioned first or second embodiment. For example, the present invention may be implemented in embodiments described below. The following modifications may be combined with each other.

(1) Modification 1

In the above-mentioned embodiments, where a "display frequency" of condition data is used as data representing a level of a priority of display, a length of display time may be used, instead of a frequency of display. For example, if there are plural windows whose attribute is identical to that of a location of the terminal, a mobile communication terminal may preferentially display a window on top that has been displayed for a longer time. Alternatively, a priority of display may be arbitrarily set by a user, without making it dependent on a history of display such as a frequency or time.

If a length of display time is used as priority data, a control unit may function as a measuring unit for measuring a display time of each window.

(2) Modification 2

A "display frequency" of condition data may be a value corresponding to an attribute of a location of the terminal at which a window is displayed or a time zone in which a window is displayed. For example, in the first embodiment, where a "display frequency" is data representing a frequency at which a corresponding application has been executed, a "display frequency" may be data representing a frequency at which an application has been executed at a location having an attribute assigned to the application. Namely, in this case, a "display frequency" is data measured for each application, for each location associated with an attribute identical to that of the application.

FIG. 13 is a diagram illustrating condition data according to the modification. In the condition data shown in the drawing, items other than a "display frequency" are similar to those shown in FIG. 5.

In the condition data, a "display frequency" is data described for each attribute of a location at which a window of an application has been displayed. Taking an "online game" as an example, condition data of an online game shows that a display frequency at home is "7," a display frequency at a rail route is "4," a display frequency at a station is "1," and no window has been displayed at the other locations.

If the above-described configuration is employed, display may be performed more suitable to a condition of the terminal. For example, a display frequency may be distinguished between an application used at any location and an application intensively used at a particular location.

It is to be noted that a "display frequency" of the second embodiment may be, similarly, a frequency at which an application has been executed in a time zone associated with the application.

Alternatively, an attribute corresponding to each application may be determined on the basis of such a "display frequency." For example, an attribute whose display frequency is highest may be specified as an "application attribute" of an application. Specifically, taking an "online game" of FIG. 13 as an example, an attribute "home," whose "display frequency" is highest, is specified as an "application attribute" of the application.

(3) Modification 3

Windows of particular applications may have a fixed priority level that does not depend on the above-mentioned condition data. To realize this embodiment, a control unit may store data specifying such a window in advance, and if such a window overlaps another window, display the window according to a fixed priority level, regardless of a location or time. If a user desires that a window of a particular application be displayed on top, s/he may set a highest priority level for the application in advance.

If this embodiment is employed, and if a window exists that may cause an inconvenience to a user if displayed at the bottom of another window, for example, a window displaying a highly important message relating to an operation of the terminal, a situation where the window is obscured by another window can be avoided.

The present modification may be said to be an embodiment in which windows of specified particular applications are excluded from subjects whose priority level is determined. In the present modification, a control unit, if there are plural windows overlapping each other, including a specified window, determines a priority level of display for windows other than the specified window. The control unit displays the specified window according to a predetermined priority level, and displays the other windows according to priority levels determined on the basis of condition data.

A specification of a window may be input by a user.

(4) Modification 4

In the above-mentioned embodiments, a control unit is configured to determine only a window to be displayed on top, and a display order of the other windows is not especially mentioned. However, a control unit may determine a priority level for each of overlapping windows on the basis of the above-mentioned condition data, and display the windows so that a window of higher priority level is displayed ahead of a window of lower priority level. With the configuration employed, if a desired window is not displayed on top, a user is able to view the window with few operations. Operations in this context may include closing a top window and minimizing a top window.

In the embodiment, a control unit may determine a priority level on the basis of an attribute or a location of the terminal and condition data, or determine a priority level on the basis of a current time and condition data. Now, an example of a case will be described in which plural overlapping windows are displayed, including plural windows having an attribute identical to an attribute of a location of the terminal, and plural windows having an attribute not identical to an attribute of a location of the terminal.

It is assumed that windows wa, wb, wc, wd, we, and wf are displayed for plural applications, so that the windows overlap each other, as shown in FIG. 14. Also, it is assumed that attributes assigned to windows wa, wb, and wc are identical to an attribute of a location of the terminal, and attributes assigned to windows wd, we, and wf are not identical to an attribute of a location of the terminal. In this case, a control unit initially gives a priority level to windows wa, wb, and wc having an attribute identical to an attribute of a location of the terminal, which is higher than that of windows wd, we, and wf. Subsequently, the control unit determines a priority level for each of windows wa, wb, and wc on the basis of a level of a display frequency, and determines a priority level for each of windows wd, we, and wf on the basis of a level of a display frequency. As a result, priority levels are determined by the control units, as shown in FIG. 14.

(5) Modification 5

In the above-mentioned second embodiment, where display of windows is controlled on the basis of time, display of windows may be changed daily, monthly, or seasonally. Specifically, a control may be performed so that an application relating to business is displayed on top on weekdays, and an application relating to entertainment, such as a game, is displayed on top on holidays.

(6) Modification 6

Figure 15:
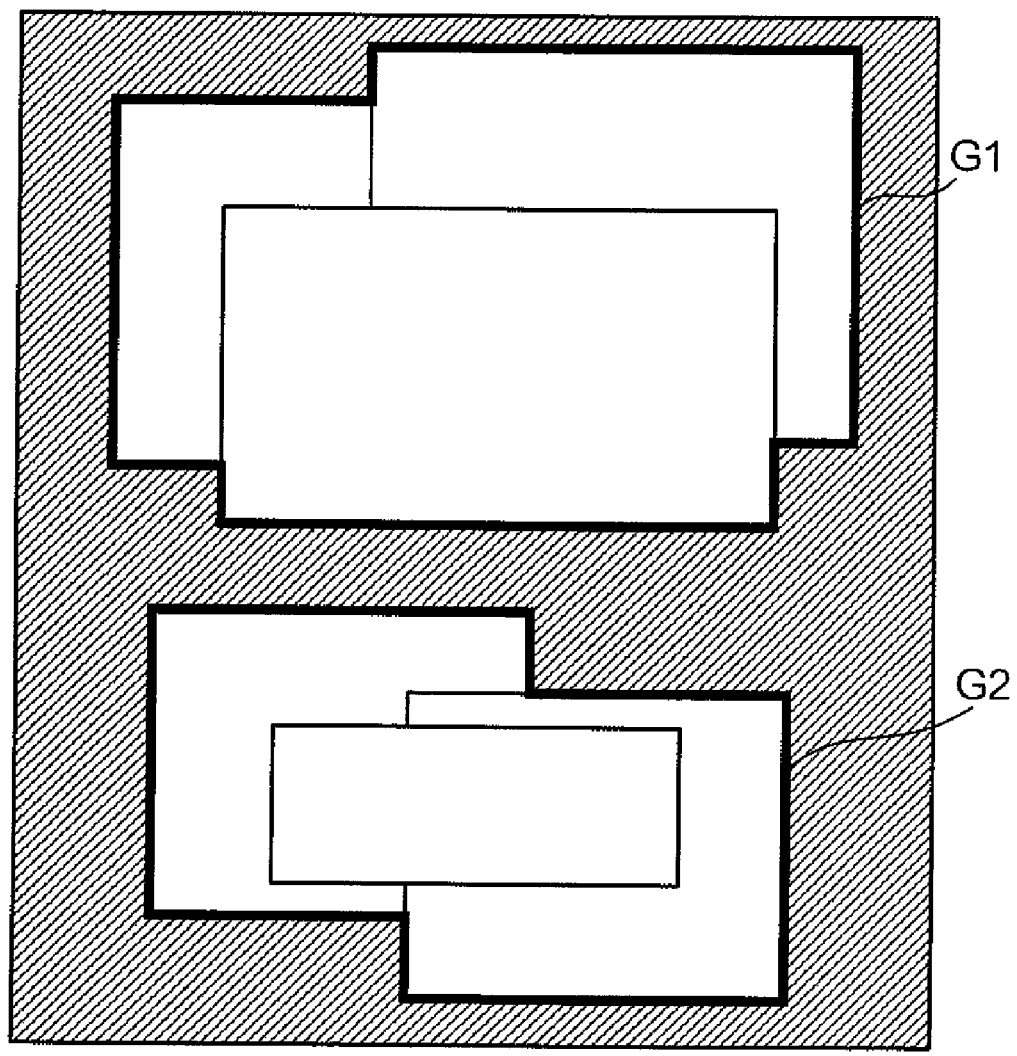
FIG. 15 is a diagram illustrating display of windows.

In the present invention, the number of windows to be displayed on top does not have to be one. For example, if windows can be classified into plural groups as shown in FIG. 15, a control unit may determine a window to be displayed on top for each group. A group in this context means a collection of windows included in an area surrounded by a closed outline. In the example shown in FIG. 15, windows are classified into group G1 and group G2. In this case, a control unit may determine a window to be displayed on top for each of group G1 and group G2. Either of the top windows may be active. In other words, in the present invention, a screen of a display unit may be divided into prescribed areas, and for each area, a window to be displayed on top or a priority level of display of a window may be determined.

Figure 16:
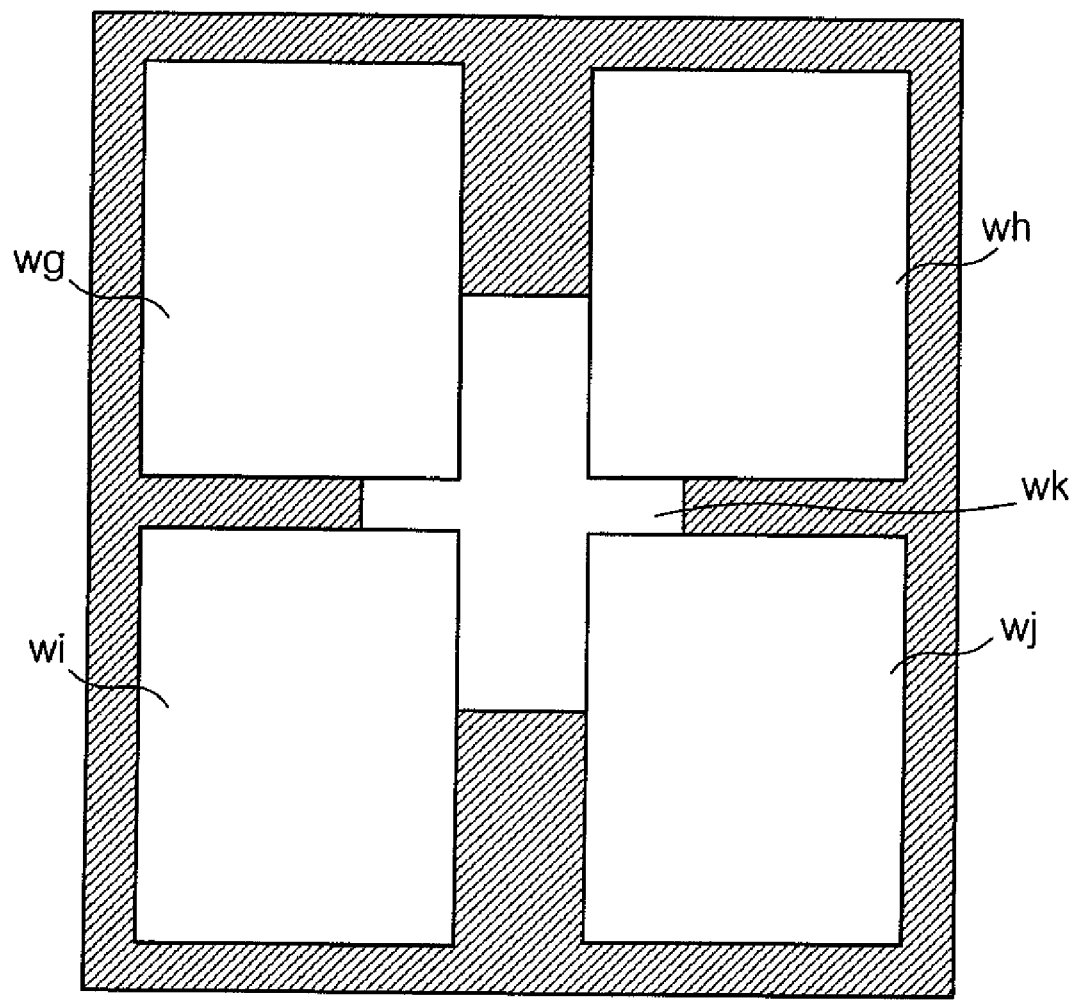
FIG. 16 is a diagram illustrating display of windows.

Also, in the present invention, if there are plural windows not overlapping each other, and the windows meet a certain condition (all the windows have an attribute identical to an attribute of a location of the terminal, or all the windows are associated with a current time), a control may be performed so that all the windows are displayed on top. For example, if, as shown in FIG. 16, there are windows wg, wh, wi, and wk not overlapping each other, while they do not overlap window wk; windows wg, wh, wi, and wj each have an attribute identical to an attribute of a location of the terminal; and window wk has an attribute different from an attribute of a location of the terminal, all windows wg, wh, wi, and wj may be displayed on top.

(7) Modification 7

In the above-mentioned embodiments, a single application is associated with a single window; however, the present invention does not have to apply only to such a relationship. For example, in a case of an application employing an MDI (Multiple Document Interface), plural windows are displayed for a single application. Accordingly, if each window of such an application is able to be associated with an attribute or a time zone, the present invention can be applied. For example, in an application such as a tab browser, an attribute may be assigned to each window, and a top window may be controlled according to a location of the terminal.

(8) Modification 8

The above-mentioned embodiments are embodiments in which the present invention is applied to a mobile phone; however, the present invention may be applied to other mobile communication terminals. For example, the present invention may be applied to a portal communication terminal such as a PDA (Personal Digital Assistance), or a car navigation system. Also, a configuration for obtaining location information may be changed depending on a configuration of a communication terminal. For example, in a case of a communication terminal including a configuration such as electronic tag unit 16, which is able to communicate with a reader/writer, so-called presence information (information identifying which reader/writer a communication terminal has communicated with) may be obtained from a reader/writer, and a location of a reader/writer may be used as location information of the terminal. Alternatively, in the case of a mobile phone, area information (information identifying which base station in a mobile communication network a mobile phone has communicated with) used for a so-called location registration may be used as location information.

In the above-mentioned second embodiment the present invention is applied to a mobile communication terminal; however, the present invention may be applied to non-mobile information processing devices. For example, the invention described in the second embodiment may be applied to a desktop personal computer. If an information-processing device has no means for keeping time, time data may be obtained from an external device. For example, time data may be obtained from a reader/writer, as in the case of the above-mentioned presence information.

(9) Modification 9

In the above-mentioned embodiments, the present invention is described as a function of an OS; however, the present invention may be realized as an independent application. Alternatively, a function of the present invention may be added to an existing application such as an OS as a plug-in. If such an embodiment is employed, the present invention may be provided as a program for providing a computer (a mobile communication terminal or an information processing device) with the above-mentioned function. The program may be provided while being stored in a recording medium such as an optical disk, or provided from a server via a network such as the Internet.

The invention claimed is:

1. A mobile communication terminal comprising:
   a detecting means for detecting a present location of the mobile communication terminal;
   an identifying means for identifying windows overlapping another window on a display means;
   a storage means for storing the windows and locations associated with the windows;
   a determining means for determining priority levels of display for the windows identified by the identifying means based on the present location, so that a priority level of a window stored in the storage means in association with the present location detected by the detecting means is higher over a priority of a window that is not in association with the present location detected by the detecting means; and
   a display control means for displaying the window whose priority level determined by the determining means is higher ahead of the window that is not in association with the location detected by the detecting means.

2. A mobile communication terminal according to claim 1, comprising a specifying means for specifying a window, wherein if a window specified by the specifying means is included in the identified windows, the display control means displays the window on top.

3. A mobile communication terminal according to claim 1, comprising a history storage means for storing for each window displayed by the display means, a display frequency and a display time length, the display frequency and the display time length being stored for each location, wherein if there are plural windows that are stored in the storage means in association with the present location detected by the detecting means, the determining means sets a higher priority level of a window among the plurality of windows whose frequency or time length stored in the history storage means in association with the present location is higher as compared to the other windows among the plurality of windows.

4. An information processing device comprising:
   a detecting means for detecting a time;
   an identifying means for identifying windows overlapping another window on a display means;
   a storage means for storing the windows and time periods associated with the windows;
   a determining means for determining priority levels of display for the windows identified by the identifying means, so that a priority level of a window stored in the storage means in association with a time period including the time detected by the detecting means is higher over a priority of a window that is not in association with the time detected by the detecting means;
   a display control means for displaying all the window whose priority level determined by the determining means is higher ahead of all the window that is not in association with the time detected by the detecting means; and
   a history storage means for storing for each window displayed by the display means, a display frequency and a display time length, the display frequency and the display time length being stored for each time period, wherein if there are a plurality of windows that are stored in the storage means in association with a time period including the time detected by the detecting means, the determining means sets a priority level of a window higher among the plurality of windows whose frequency or time length stored in the history storage means in association with the time period is higher as compared to the other windows among the plurality of windows.

5. An information processing device according to claim 4, comprising a specifying means for specifying a window, wherein if a window specified by the specifying means is included in the identified windows, the display control means displays the window on top.

6. A computer program product comprising instructions on a non-transitory computer-readable medium, the computer program product for causing a computer to execute the steps of:
   detecting a present location of a mobile communication terminal;
   identifying a plurality of overlapping windows on a display means;
   identifying a first window of the plurality of overlapping windows, with reference to a storage means for storing the plurality of windows and locations associated with the plurality of windows, the first window being stored in association with the detected present location, and determining priority levels of display of remaining windows in the plurality of windows based on the present location so that a priority level of the first window is higher as compared to the priority level of the remaining windows in the plurality of windows; and
   displaying the windows in order of priority level.

7. A computer program product comprising instructions on a non-transitory computer-readable medium, the computer program product for causing a computer to execute the steps of:
   detecting a time;
   identifying a plurality of overlapping windows on a display means;
   determining priority levels of display for the identified plurality of windows with reference to a storage means for storing the plurality of windows and time periods associated with the plurality of windows, so that a priority level of a first window stored in association with a time period including the detected time is higher as compared to the priority level of remaining windows in the plurality of windows;
   displaying the windows in order of priority level; and
   storing, for each window displayed by the display means, a display frequency and a display time length, the display frequency and the display time length being stored for each time period, wherein if there are a plurality of windows that are stored in association with a time period including the time detected, setting a priority level of a window higher among the plurality of windows whose frequency or time length stored in association with the time period is higher as compared to the other windows among the plurality of windows.

* * * * *

UNITED STATES PATENT AND TRADEMARK OFFICE
CERTIFICATE OF CORRECTION

| | | |
|---|---|---|
| PATENT NO. | : 8,386,948 B2 | Page 1 of 1 |
| APPLICATION NO. | : 12/594692 | |
| DATED | : February 26, 2013 | |
| INVENTOR(S) | : Yasushi Onda et al. | |

It is certified that error appears in the above-identified patent and that said Letters Patent is hereby corrected as shown below:

In the Claims

Column 15, Line 54, remove "all" after the word "displaying".

Column 15, Line 56, remove "all" after the word "of".

Signed and Sealed this
Third Day of December, 2013

Margaret A. Focarino
*Commissioner for Patents of the United States Patent and Trademark Office*